United States Patent [19]

Grotz

[11] Patent Number: 5,427,760
[45] Date of Patent: Jun. 27, 1995

[54] AXIAL-RADIAL REACTORS IN THE BRAUN AMMONIA SYNLOOP WITH EXTRNAL HEAT SINK

[75] Inventor: Bernard J. Grotz, Pasadena, Calif.

[73] Assignee: Brown & Root Petroleum and Chemicals, Alhambra, Calif.

[21] Appl. No.: 199,088

[22] Filed: Feb. 22, 1994

[51] Int. Cl.6 ................................................. C01C 1/04
[52] U.S. Cl. ....................................... 423/360; 423/361
[58] Field of Search .................. 422/148; 423/360, 361

[56] References Cited

U.S. PATENT DOCUMENTS

| 3,721,532 | 3/1973 | Wright et al. | 422/148 |
|---|---|---|---|
| 3,851,046 | 11/1974 | Wright et al. | 423/359 |
| 4,372,920 | 2/1983 | Zardi | 422/148 |
| 4,405,562 | 9/1983 | Zardi et al. | 422/148 |
| 4,769,220 | 9/1988 | Zardi | 422/148 |
| 4,867,959 | 9/1989 | Grotz | 423/360 |
| 4,921,684 | 5/1990 | Grotz et al. | 423/360 |
| 4,935,210 | 6/1990 | Zardi | 422/148 |
| 4,946,657 | 8/1990 | Zardi | 422/148 |
| 4,963,338 | 10/1990 | Zardi et al. | 423/360 |
| 5,006,316 | 4/1991 | Zardi et al. | 422/148 |
| 5,130,098 | 7/1992 | Zardi et al. | 422/148 |
| 5,152,977 | 10/1992 | Zardi et al. | 423/659 |
| 5,171,543 | 12/1992 | Zardi et al. | 422/148 |
| 5,254,316 | 10/1993 | Zardi et al. | 423/360 |
| 5,352,428 | 10/1994 | Bhakta et al. | 423/360 |

OTHER PUBLICATIONS

"Revamping Ammonia Converters", editors, Nitrogen, Jan./Feb. 1987, No. 165, pp. 28–31.
"New Synloop Lowers Ammonia Production Costs", Wilson/Grotz/Richez, Nitrogen '86, Amsterdam, Apr. 20–23, 1986, The British Sulphur Corporation.
"Two-Stage Adiabatic Ammonia Synthesis Converter", Glover/Yoars, Ammonia Plants Safety Symposium, American Institute of Chemical Engineers, Aug. 29, 1972.
"The Kellogg advanced ammonia process", LeBlanc/Shires. Hydrocarbon Technology International, 1992 (month not available).

Primary Examiner—Wayne Langel
Attorney, Agent, or Firm—David T. Bracken

[57] ABSTRACT

The present invention discloses application of axial-radial reactors to the Braun synloop using an external heat sink between the feed/effluent exchanger and the inlet to the second reactor. The advantages of the axial-radial reactors in the Braun synloop have been heretofor unavailable for failure of the prior art to combine the advantages of the high conversion disclosed in U.S. Pat. No. 4,867,959 with axial-radial reactors.

18 Claims, 7 Drawing Sheets

AXIAL-RADIAL REACTORS IN THE BRAUN AMMONIA SYNLOOP WITH EXTRNAL HEAT SINK

FIELD OF INVENTION

The present invention relates to the field of ammonia production, and, particularly, to the integration of axial-radial flow to axial flow ammonia synthesis converters.

BACKGROUND

The major objectives of any ammonia synthesis process design are to (1) efficiently contact synthesis gas with catalyst at proper temperature and pressure, (2) control the exothermic heat of reaction to protect the catalyst from overheating, (3) recover the heat of reaction in an efficient manner, (4) minimize the energy consumed by synthesis gas compression, recirculation, and ammonia refrigeration, and (5) balance the capital cost of equipment and catalyst against energy consumption to provide an economical design.

One of the major differences between synthesis processes is the way by which the heat of reaction is removed. There are at least three methods used today. Heat is removed by (1) using heat exchange tubes within the catalyst bed, (2) quenching the hot effluent gas in or between beds, and (3) indirect cooling applied between beds or reactors. Brown & Root, Inc. (formerly C F Braun & Co.) has chosen to develop a design around the indirect cooling approach. This synloop design will hereinafter be referred to as the "Braun" synloop. U.S. Pat. No. 3,851,046 to Wright et al (Wright '046), and assigned to Brown & Root, Inc., covers a process consisting of two adiabatic reactors. Each reactor contains a single catalyst bed. The feed to the first reactor is heated by exchange with the first reactor effluent. The cooled first reactor effluent is fed to the second reactor for additional ammonia synthesis. In Wright '046, heat exchangers are outside the reactor high pressure shells.

In addition, a helpful description of the Braun synloop process of Wright '046 is made in an article "Two Stage Adiabatic Ammonia Synthesis Converter" (Glover and Yoars, pp. 1-19, presented at the American Institute of Chemical Engineers Ammonia Plants and Related Facilities Safety Symposium, Minneapolis, Minn., 1972). FIG. 4 of that article shows the adiabatic reaction paths of the first two reactors are represented by the line segments A-B and D-E for 160 bar operation. For operation at about 200 bar, the reaction path of the first reactor is represented by the line segment A-C. For operation of the second reactor at about 200 bar, there is no line segment specifically representing the reaction path, but applying a horizontal, parallel line to that of line segment B-D from point C intersects the D-F line segment at a temperature of slightly less than 800° F. The line segment from that line intersection to point F is the adiabatic reaction path for the second reactor operating at about 200 bar. It is critical to understanding of the Braun synloop as practiced in Wright '046 to have this result firmly in mind before further analysis. It must be understood that, regardless of the operating pressure, the ultimate ammonia concentration from the second reactor of the Braun synloop of Wright '046 will always lie on the line segment D-E-F. This unique relationship is a due to the use of only a feed/effluent exchanger between the first and second reactors to control inlet temperature to the second reactor. The reasons for this unique relationship will later be more fully described.

In the article entitled "New Synloop Lowers Ammonia Production Costs" by Wilson, Grotz, and Richez, through presentation to the World Nitrogen Fertilizer Conference in Amsterdam (Apr. 20-23, 1986, pp. 1-17, British Sulfur Corporation Ltd.), the authors defined what is meant by an adiabatic reactor through reference to FIG. 1 of that article. FIG. 1 shows a Braun adiabatic reactor with a close-coupled feed-effluent exchanger. The reactor consists of a single adiabatic catalyst bed in a fixed hopper, surrounded by a high pressure shell. Flow of synthesis gas is into the exchanger shell inlet nozzle, through the exchanger shell, upwards though the reactor outlet channel, upwards through the annular space between the hopper and reactor shell, down through the catalyst bed, through the gas collector, and through the exchanger tubes. This flow pattern keeps the reactor shell in contact with relatively cool feed gas allowing low chrome metallurgy for the pressure shell.

The close-coupled design (U.S. Pat. No. 4,554,135 to Grotz et al and assigned to Brown & Root, Inc.) reduces metallurgical requirements for the reactor outlet channel, shortens high temperature piping, and reduced pressure drop. Steam generators are close-coupled to reactors in similar fashion to the feed-effluent exchanger shown in FIG. 1. The close-coupled design for the heat exchanger and steam generator were first used in the 1360 ton per day ammonia plant of BASF at Ludwigshafen in 1982.

The adiabatic reactor thus has a single bed of catalyst with no heat transfer between the gas flows of the synthesis gas streams within the reactor and external heat sink streams. The external heat sinks are used in other designs within the reactor shell to remove exothermic heat from the effluent of the catalyst beds. Since, for Wright '046, all heat exchangers are external to the reactor, their mechanical design and dimensions can be optimized independently of the reactor. Also, if the exchangers need maintenance, it can be performed without entering the reactors or removing the catalyst.

The adiabatic reaction paths of the process of Wright '046, as described in the Glover and Yoars article for the two-reactor synloop, are also shown in the FIG. 4 of the Wilson, Grotz, and Richez article. Unlike a quench-type reactor, all of the synthesis gas passes through all of the catalyst volume. In quench-type designs, part of the synthesis gas must bypass part of the catalyst. An indirectly-cooled reactor can produce the same amount of ammonia with less catalyst volume than require for a quench design.

Two- or three-reactor synloops of FIGS. 2 and 3 of the Wilson, Grotz, and Richez article are described in examples operating at about 160 bar. Synthesis gas make-up and recycle streams are combined and are heated against the already cooled effluent of the final reactor to about 280° C. Then the synthesis gas is heated to 400° C. in a feed/effluent exchanger against the effluent of the first reactor. That effluent of the first reactor, at 520° C. and containing about 11 mole percent ammonia, is cooled in the feed/effluent exchanger to 400° C. The second reactor effluent, at 480° C. and containing about 16.5 mole percent ammonia, is cooled by generating steam, in this example, at 105 bar. For the two-reactor synloop, the cooled effluent of the second reactor is further cooled against the incoming synthesis gas. For the three-reactor synloop, the cooled effluent of the second reactor is fed to a third reactor. The effluent of that third reactor is cooled by generating steam and then by heat exchange against the incoming synthesis gas. The effluent of the third reactor contains about 20 mole percent ammonia.

U.S. Pat. No. 4,935,210 to Zardi et al (Zardi '210) changes the flow of synthesis gas from primarily axial to axial-radial through all of the reactors of the two-and three-reactor synloop described in the Wilson, Grotz, and Richez article. That change of primarily axial to axial-radial flow of synthesis gas through catalyst beds of several synloop designs is shown in U.S. Pat. Nos. 5,254,316, 5,171,543, 5,152,977, 5,130,098, 4,935,210, 4,849,206, 4,769,220, 4,755,362, 4,405,562, and 4,372,920. Every one of the cited patents causes the axial-radial flow to be used in every catalyst bed in the synloop design described. Typically, those cited patents describe synloop designs previously developed by technology licensors other than the named assignee of the patents and the patents are directed to revamping existing synloop designs. In order to obtain the maximum pressure drop reduction through the synloop, the axial-radial conversion described in the above cited patents has been required in all of the catalyst beds of the relevant synloop designs.

U.S. Pat. No. 4,867,959 to Grotz (Grotz '959) is herein incorporated for enabling description. That patent was also assigned to Brown & Root, Inc. and describes its current design relating to heat transfer in the Braun synloop. Grotz '959 uses a high temperature heat sink between the feed/effluent exchanger and second reactor of Wright '046. That external heat sink removal of exothermic reaction heat is essential to achieve reduced gas inlet temperatures the result of catalyst improvements.

At the time of Wright '046, it was believed by those skilled in the art that ammonia synthesis catalyst required temperatures of greater than 400° C. to initiate synthesis. Catalyst improvements and/or improved understanding of the then existing catalysts have reduced that required inlet temperature to a range of 350°–380° C. for many commercially available catalysts. Reducing inlet temperatures results in higher outlet ammonia concentrations, but without the improvement of Grotz '959, the process of Wright '046 and the synloop designs of the Wilson, Grotz, and Richez article cannot take advantage of those improvements. Note that the pilot plant synloop design of a competitor of Brown & Root, Inc., the M.W. Kellogg Co., in its article titled "The Kellogg advanced ammonia process (KAAP)" (Leblanc et al, Hydrocarbon Technology International, 1992, pp. 141–144) uses an external heat sink in the location shown by Grotz '959 to obtain the very low inlet temperatures to highly active, ruthenium catalyst beds. Although advances claimed by the KAAP depend on the higher activity of the ruthenium catalyst, its advantages cannot be attained in the process of Wright '046, as shown in the Leblanc et al article, without the use of the external heat sink of Grotz '959.

The incorporated disclosure of Grotz '959 describes in detail how, using modern catalysts, the system of bypasses around the feed/effluent exchanger of Wright '046 can reduce the inlet temperature of synthesis gas to the first reactor. However, that reduced inlet temperature to the first reactor results in an unacceptably high inlet temperature to the second reactor.

Conversely, the system of bypasses of Wright '046 can be used to reduce the inlet temperature of the gas to the second reactor, but which results in an unacceptably high loss of heat recovery in the boiler following the second reactor. Thus, the advantages of reduced inlet catalyst temperatures of modern catalysts cannot be practiced with the process of Wright '046 and the two- and three-reactor synloops shown in the Wilson, Grotz, and Richez article. Only the improvement of Grotz '959 can enable the process of Wright '046 to take advantage of improvements in the reduced inlet temperatures permitted by modern catalysts.

In addition to the higher pressure drop across axial flow reactors as compared with axial-radial flow reactors, the use of axial flow in the process of Wright '046 has led to the additional following limitation. Axial flow pressure drop can be significantly reduced with the use of large grained catalysts. Consequently, large grained catalysts have been favored in the Braun synloop designs. Unfortunately, the large grained catalysts have lower reaction rates per volume of catalyst than fine grain catalysts used in radial and axial-radial synloop reactors. This has been compensated for in the Braun synloop designs by providing more catalyst volume. The two-reactor, axial-radial synloop at 210 bar described in Zardi '210 was to have used the process steps of the two- and three-reactor synloops of the Wilson, Grotz, and Richez article, replacing primarily axial flow reactors with axial-radial flow reactors. Referring now to the FIGS. 1 to 7 of this application, Zardi '210 is shown schematically in FIG. 1 to present its significant process features. Such a drawing was not included with the Zardi '210 patent to describe the Braun synloop in its then current design. Reactors 1-1 and 2-2 each contain axial-radial flow baskets 3-1 and 4-1, wherein each basket contains a single catalyst bed. Synthesis gas A-1 is first heated in heat exchanger 5-1 against synthesis gas G-1 to a temperature of 280° C. to become synthesis gas B-1. This temperature of synthesis gas B-1 of 280° C. corresponds to a practical optimum based on 105 bar steam generation. In order to obtain that practical optimum, the temperature approaches of exchangers 5-1 and 7-1 must be evaluated and adjusted so as to recover heat at the highest possible levels to improve overall process efficiency. The temperature approach in exchanger 7-1 is about 10° C. and the temperature approach in exchanger 5-1 is about 45° C. Since the temperature of boiling water at 105 bar is about 315° C., the temperature of synthesis gas B-1 is (315° C.+10° C.−45° C.=) 280° C.

The synthesis gas B-1 is heated in feed/effluent exchanger 7-1 against synthesis gas D-1 to a temperature of 400° C. to become synthesis gas C-1. Synthesis gas C-1, having been heated to the required inlet temperature for the process described in the Wilson, Grotz, and Richez article, flows axially and radially through the single catalyst bed of reactor 1-1 and emerges as synthesis gas D-1 at 540° C. Synthesis gas D-1 is cooled from 540° C. to 420° C. in feed/effluent exchanger 6-1 to become synthesis gas E-1.

Synthesis gas E-1 enters catalyst bed 9-1 through its upper surface and through the perforated outer sides of the axial-radial flow basket 4-1. Zardi '210 is herein incorporated for enabling disclosure relating to the design of the axial-radial flow baskets. Synthesis gas F-1 is collected from the central perforated pipe and is cooled in exchanger 7-1, generating 105 bar steam to become synthesis gas G-1. Synthesis gas G-1 is further cooled against synthesis gas A-1 in exchanger 5-1 to become synthesis gas H-1.

The reaction path of the process described in Zardi '210 for a two-reactor Braun synloop is shown in FIG. 5. The ultimate ammonia concentration of synthesis gas F-1 falls short of the 20.6 mole percent predicted by Zardi '210. The actual concentration of synthesis gas F-1 is less than 19.0 mole percent. The result predicted by Zardi '210 was due to a lack of care in evaluating the Braun synloop. As described above, an understanding of the adiabatic reaction paths are critical to analysis of the Braun synloop. In the process of Wright '046 and the two-reactor synloop of the Wilson, Grotz, and Richez article, the required temperature rise of synthesis gases B-1 to C-1 is about 120° C. Because the outlet temperature of the catalyst bed 8-1 at synthesis gas D-1 is about 540° C. at 210 bar, the feed/effluent exchanger 61 can only cool the synthesis gas D-1 to about 420° C. An inlet temperature of 420° C. for a catalyst bed of the Wright '046 process results in reduced outlet ammonia conversion compared to a 400° C. inlet temperature.

To compare the 210 and 160 bar operations of the process of Wright '046 and Zardi '210, FIG. 5 of the present application shows the adiabatic reaction paths of both modes of operation. The adiabatic reaction paths for 210 bar operation are shown as C-1 to D-1 for the first reactor and E-1 to F-1 for the second reactor. The adiabatic reaction paths for 160 bar operation are shown as C-1' to D-1' for the first reactor and E-1' to F-1' for the second reactor. Note the unique relationship, as described above, between the synloop pressure and the ultimate ammonia concentration to be achieved by the two-reactor synloop. The adiabatic reaction path shown by line segment E-1' to F-1 represents the only range of ammonia concentrations that can be achieved by the two-reactor Braun synloop as practiced with the process of Wright '046 given the inlet conditions noted on the FIG. 5.

Zardi '210 failed to appreciate that operating the synloop at 140–160 bar avoids excess inlet temperatures to catalyst beds. At that pressure range, the reaction heat generated in catalyst bed 6-1 matches the heat required to heat synthesis gas B-1 from 280° C. to 400° C. Grotz '959 solves this problem. The process steps of Grotz '959 are shown schematically in FIG. 2. The pressure and temperatures of the synthesis gases A-2 to E-2 are as described for synthesis gases A-1 to E-1. Synthesis gas E-2, however, is further cooled in heat sink exchanger 10-2 to become synthesis gas I-2 at about 400° C. The temperatures of synthesis gases F-2 to H-2 are as described for synthesis gases F-1 to H-1. Reactors 1-2 and 2-2 contain catalyst beds 8-2 and 9-2 respectively, wherein the synthesis gas passes axially to exit in the perforated, central gas collection pipes.

Note that the heat sink exchanger 10-2 frees dependence of the synloop pressure from the reaction heat generated in either catalyst beds 8-2 or 9-2. FIG. 6 shows the reaction path of the two-reactor synloop in FIG. 2 operating at 210 bar. The notations for points on the graphs of the reaction paths in FIGS. 5, 6, and 7 correspond to the synthesis gas notations in FIGS. 1 to 4. The goal of reaching the desired inlet temperature of 400° C. for synthesis gas I-2 can now be achieved through the use of the heat sink exchanger 10-2. The goal of reaching an ultimate ammonia concentration of 20.6 mole percent at a 210 bar synloop is also achieved.

The Braun axial two-reactor synloop was represented in Zardi '210 as reaching only 17 mole percent ammonia. The axial-radial two-reactor synloop was said in Zardi '210 to have reached 20.6 mole percent ammonia. Such a conclusion is clearly erroneous. Failure to achieve minimum and optimum reactor inlet temperatures will prevent such performance.

The need for the heat sink exchanger 10-2 has heightened as improvements in ammonia synthesis catalysts reduce the required inlet temperatures. As reactor inlet temperatures are reduced, the equilibrium reactor outlet ammonia concentrations increase and thus reduce required synloop flows for equivalent ammonia production. Without the heat sink exchanger 10-2, the maximum operating pressure for the synloop would be forced ever downward so that reaction heat in the first reactor could match preheating of synthesis gas fed to the first reactor.

The claims of reduced pressure drop through the axial-radial catalyst beds of Zardi '210 are based in substantial part on the erroneous assumption that ultimate ammonia concentration will increase from 17 to 20.6 mole percent using the axial-radial reactors. To achieve the same ammonia production, Zardi '210 would presume that hydraulic flow would be reduced by about 17 percent using axial-radial flow reactors as compared with axial flow reactors. Thus, the erroneous conclusion as to ultimate ammonia concentration also results in an erroneous conclusion that pressure drop will be reduced by 2 bar through use of axial-radial catalyst beds in the synloop of Wright '046 and the two-reactor synloop of the Wilson, Grotz, and Richez article.

SUMMARY OF THE INVENTION

The present invention combines the use of the heat sink exchanger 10-2 (as also described in Grotz '959) with the use of axial-radial flow reactors in the Braun synloop. Either two- or three-reactor synloops are used. Achieving the highest ultimate ammonia concentration and reducing pressure drop in a synloop are co-dependent on the use of both concepts in single invention.

In addition, the present invention reduces the requirement that all catalyst beds be changed from axial to axial-radial to benefit from reduced pressure drop. In many circumstances, the incentive to install axial-radial catalyst beds disappears after such modification of the first catalyst bed alone, or, alternately, in the first two catalyst beds of a three-reactor synloop.

Another aspect of the present invention is the heretofore unrealized improvement in narrowing the approach to equilibrium temperatures at the reactor outlet using axial-radial flow catalyst beds in the Braun synloop. Using the process of Wright '046 and the two- or three reactor synloop of the Wilson, Grotz, and Richez article with axial-radial flow catalyst beds permits closer approach to equilibrium temperatures at the first reactor outlet. However, for the same reason described above, such an improvement cannot result in significantly higher ultimate outlet concentrations of ammonia without the heat sink exchanger 10-2 (also described in Grotz '959). The higher reactor outlet temperatures potentially available by use of axial-radial flow reactors result in more reaction heat transfer to synthesis gas D-1, which, without the improvement of Grotz '959, merely results in further temperature increase of synthesis gas E-1. While narrowing the approach temperature increases ammonia concentration from the outlet of the first reactor, second reactor inlet temperature also increases, resulting in the same ultimate ammonia concentration.

DESCRIPTION OF THE PREFERRED EMBODIMENTS

Figure 1:
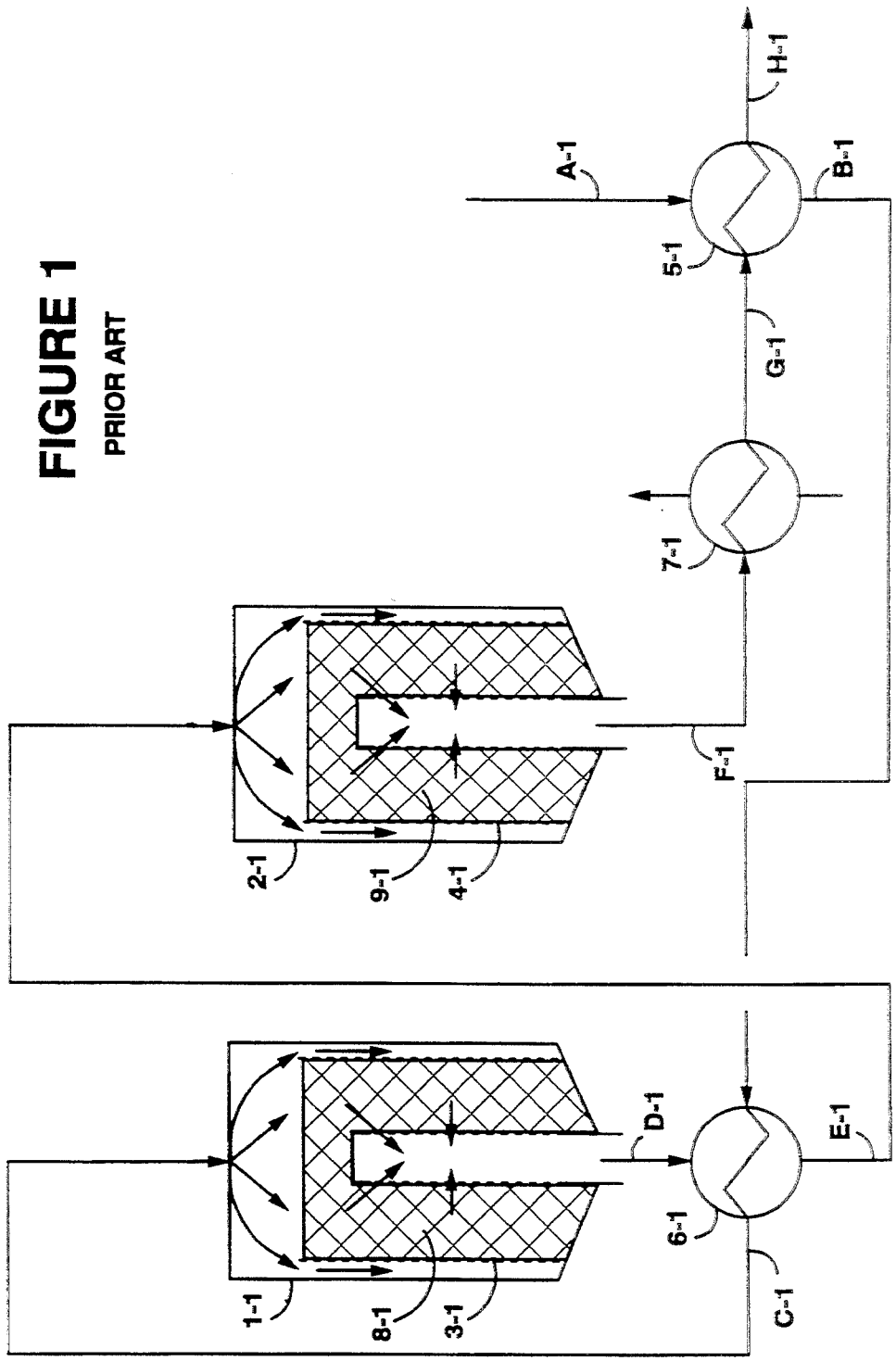
FIG. 1 is a schematic diagram of the significant process features of U.S. Pat. No. 4,935,210 to Zardi et al.
Figure 2:
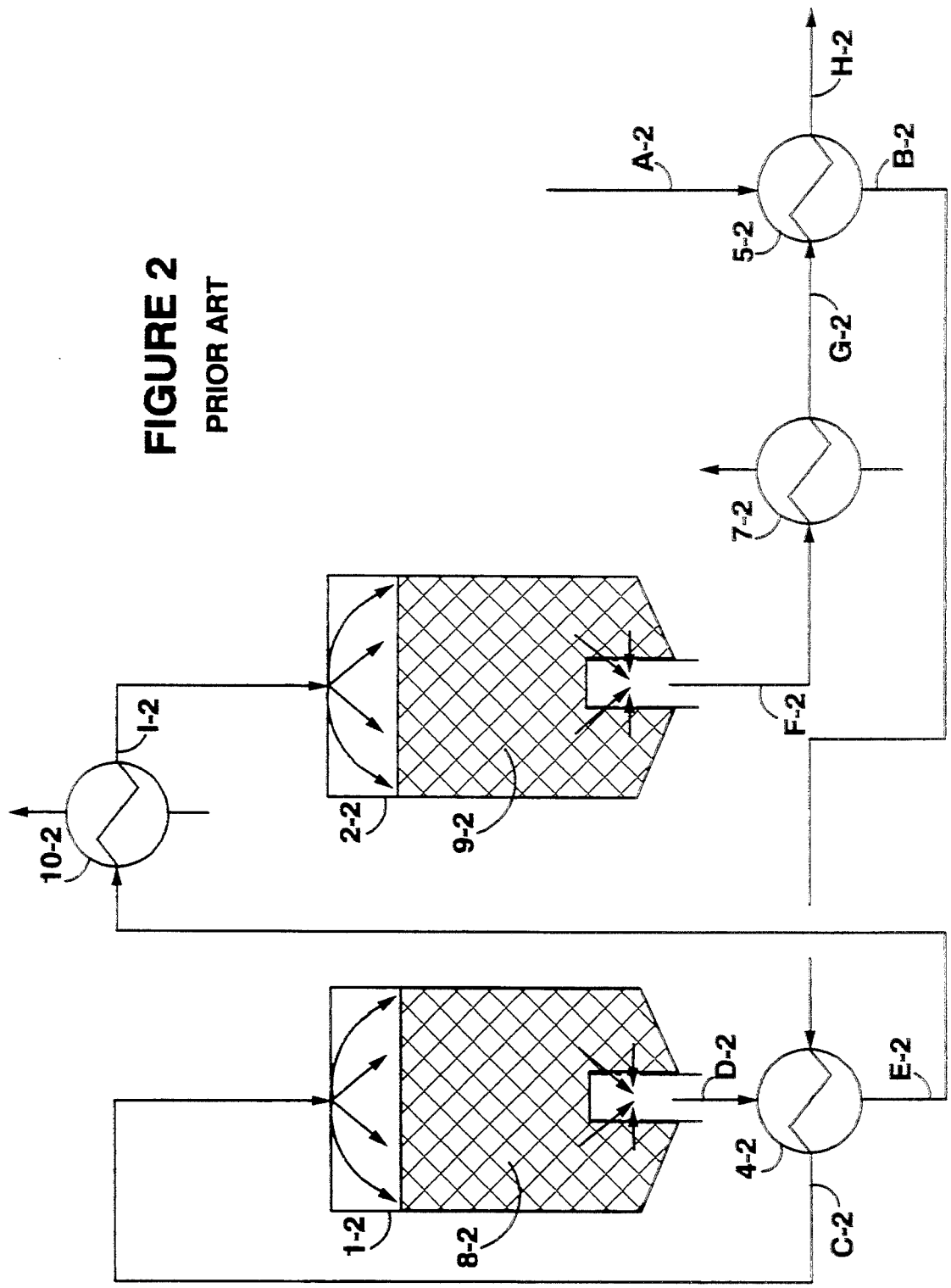
FIG. 2 is a schematic diagram of the process steps of U.S. Pat. No. 4,867,959 to Grotz.
Figure 3:
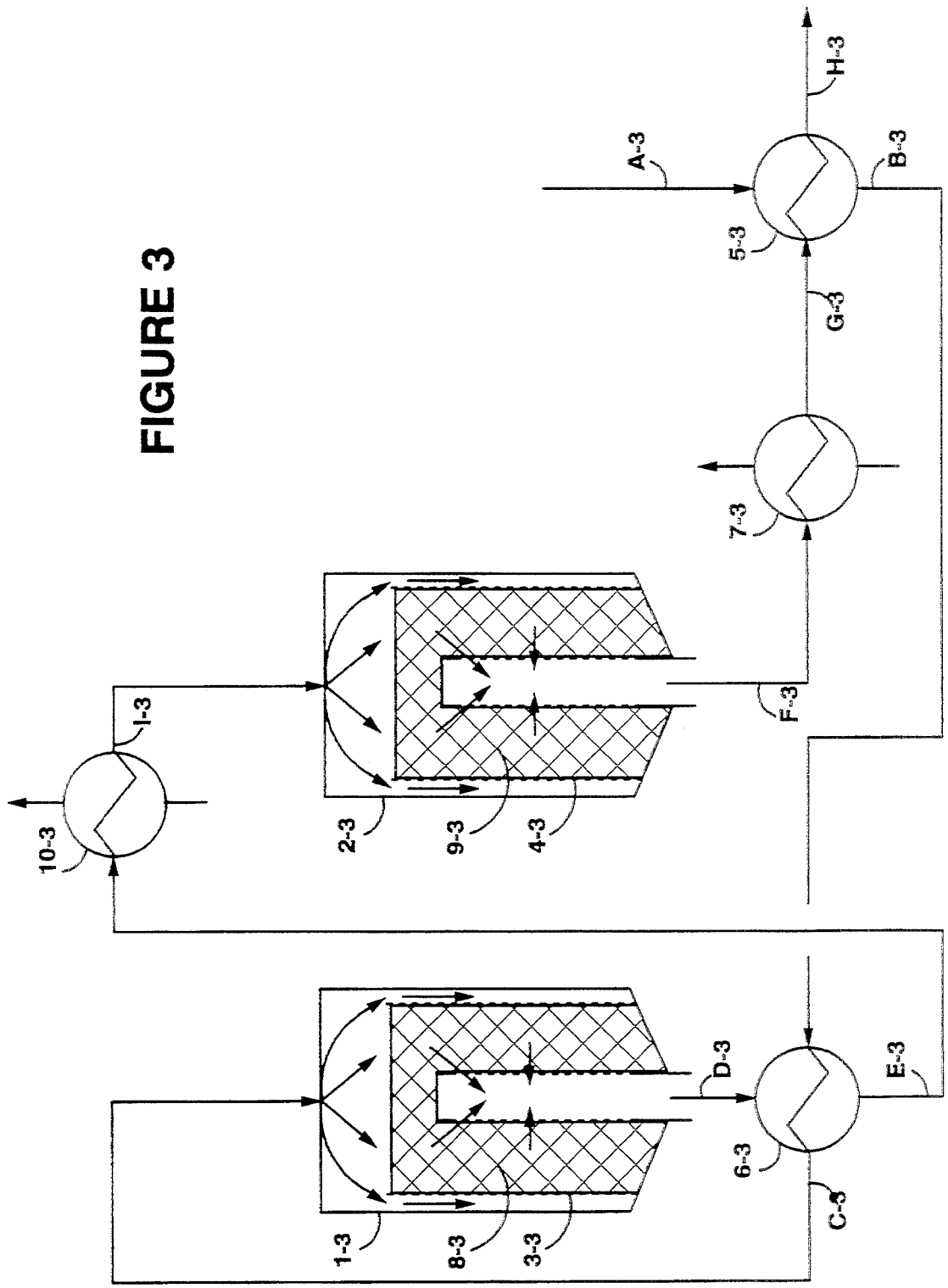
FIG. 3 is a schematic representation of the present invention wherein axial-radial flow catalyst beds are provided for each reactor in the synloop.
Figure 4:
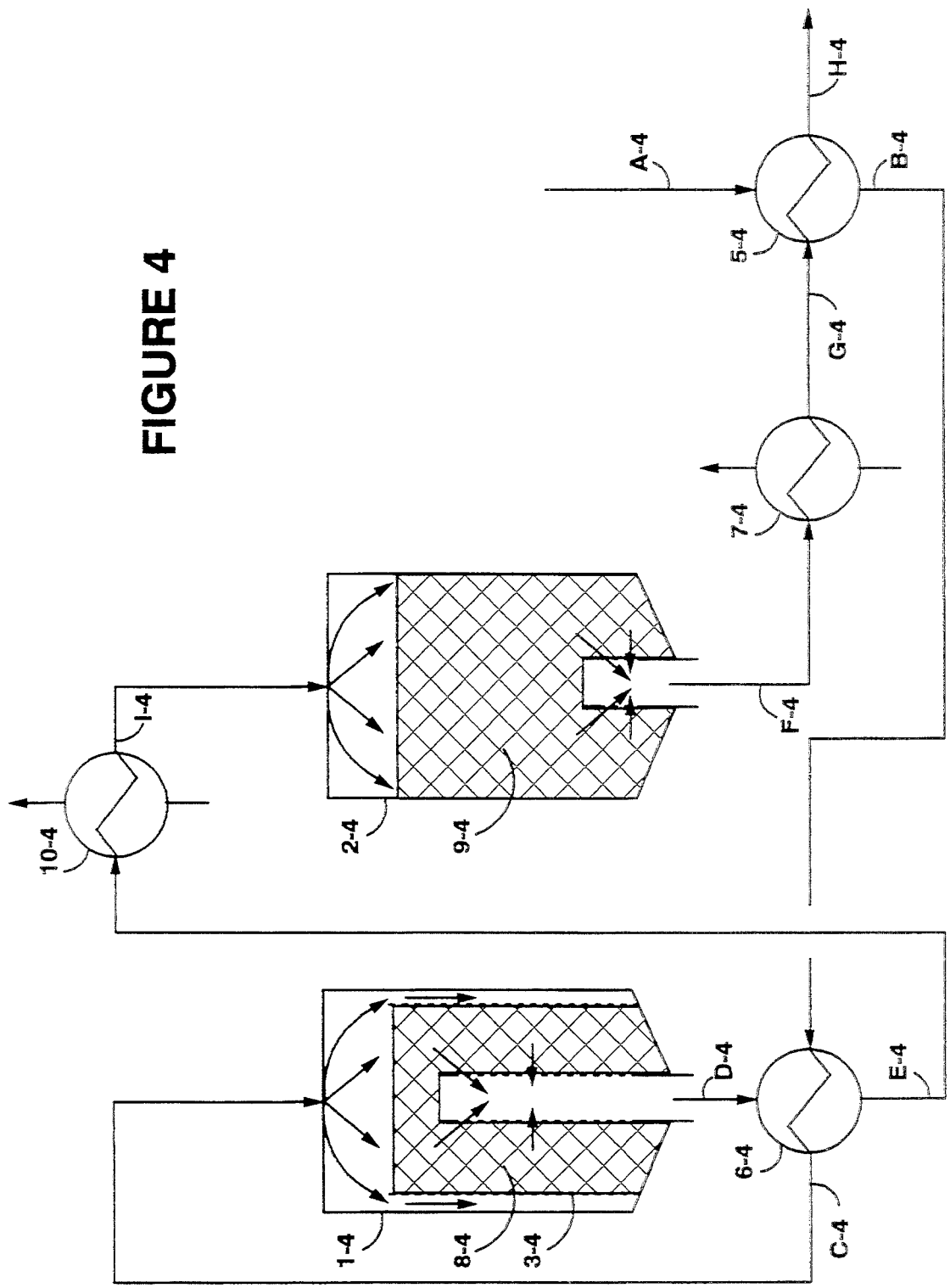
FIG. 4 is similar to FIG. 3 with the exception that the reactor 2-3 is changed from axial-radial to axial flow in reactor 2-4.
Figure 5:
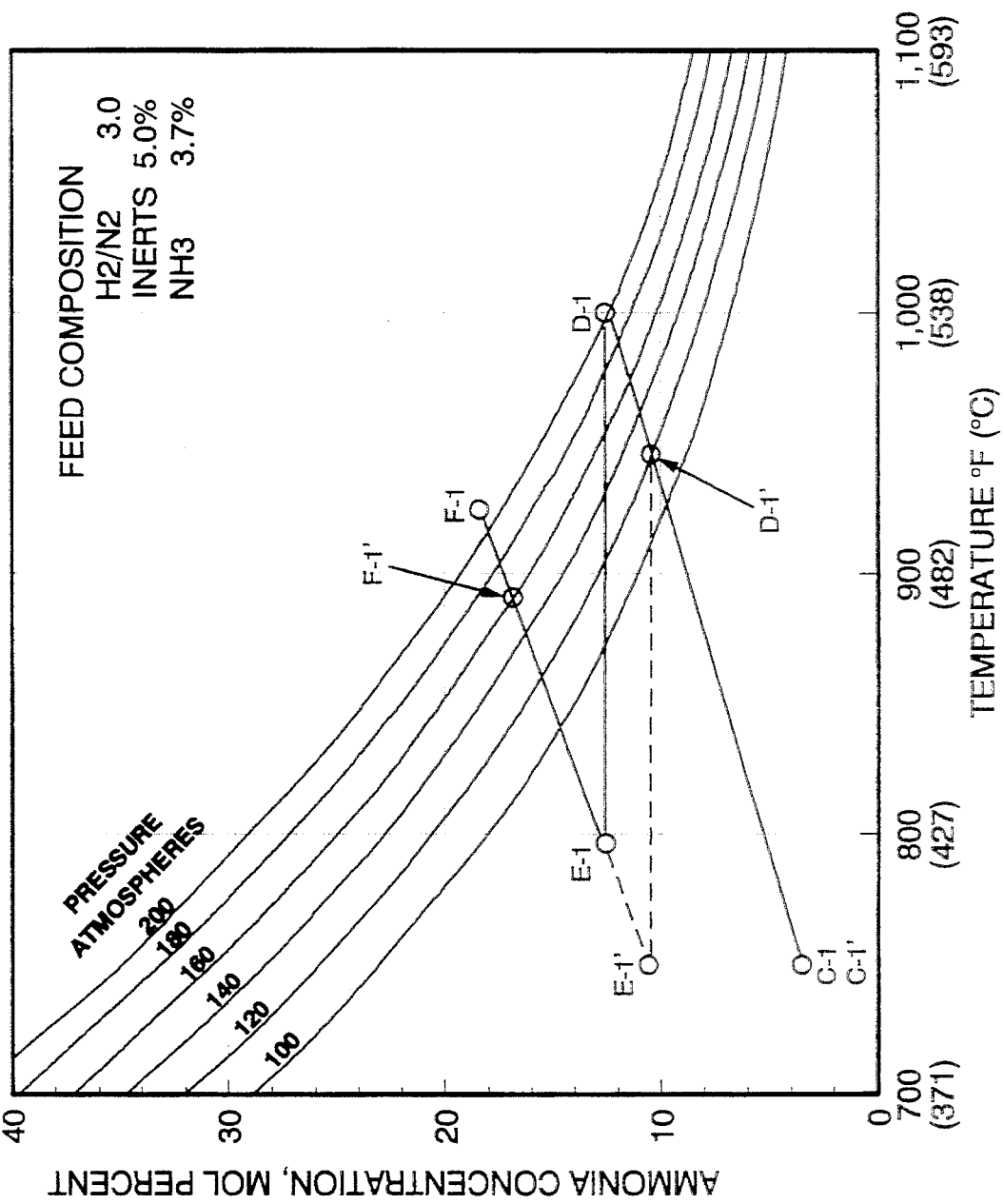
FIG. 5 shows the adiabatic reaction paths of the 210 and 160 bar operations of the processes of U.S. Pat. 3,851,046 to Wright et al and U.S. Pat. 4,935,210 to Zardi et al.
Figure 6:
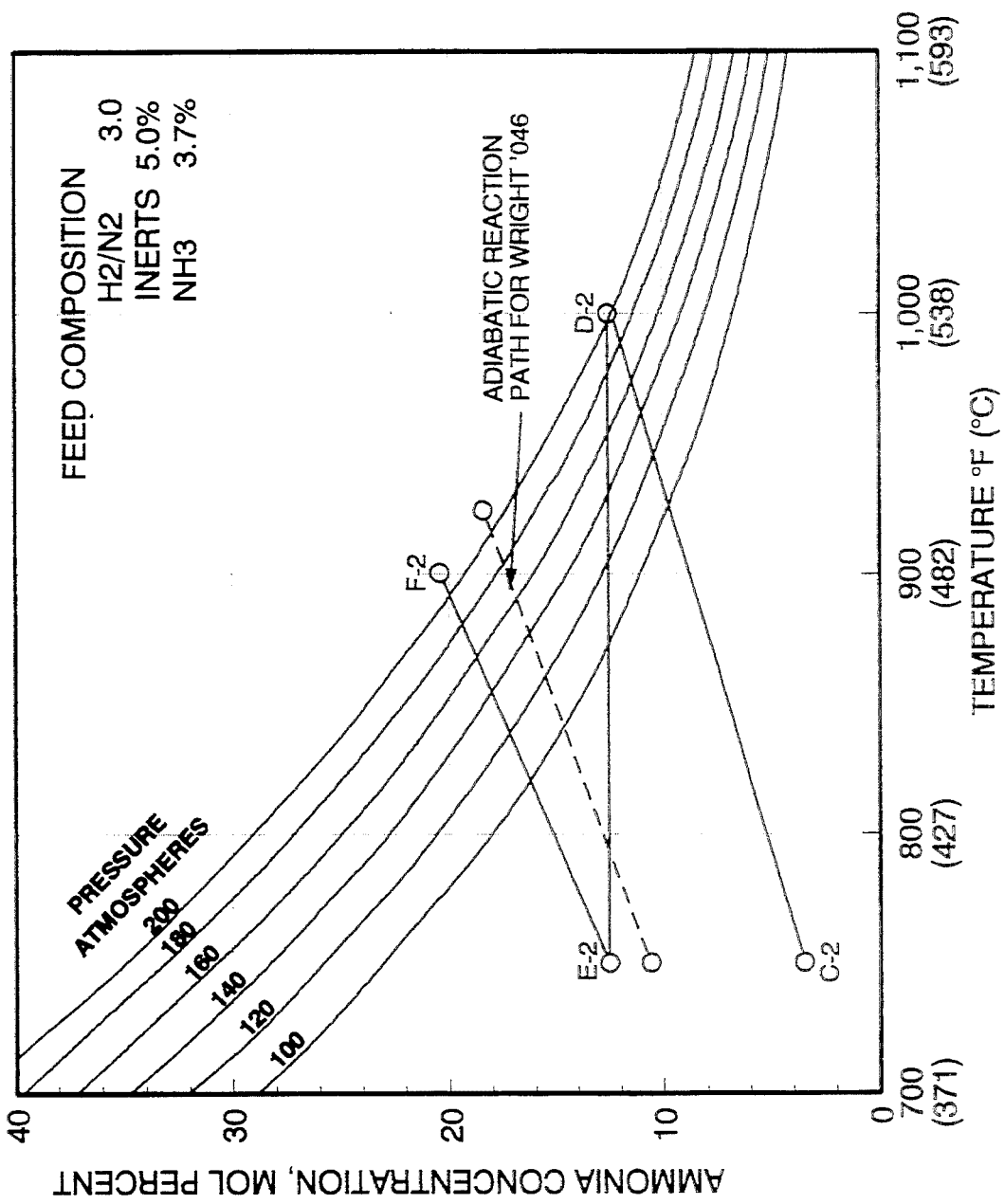
FIG. 6 shows the reaction path of the two-reactor synloop in FIG. 2 operating at 210 bar.

The present invention is now described in relation to FIGS. 3 and 4, which are schematic representations of the invention described above.

In FIG. 3, axial-radial flow catalyst beds are provided for each reactor in the synloop. In the case of a three-reactor synloop, a third reactor with an axial-radial flow catalyst bed receives synthesis gas G-3. The effluent of the third reactor is cooled in a steam generator as provided for in exchanger 7-3, and is further cooled in exchanger 5-3. The reaction path for the invention shown in FIG. 3 is presented in FIG. 7. Synthesis gas A-3 is heated to 280° C. in exchanger 5-3 to become synthesis gas B-3. Synthesis gas B-3 is heated in feed/effluent exchanger 6-3 to a temperature of 400° C. to become synthesis gas C-3 and is fed to reactor 1-3. In reactor 1-3, synthesis gas flows axially and radially through the perforations of the outer wall of the axial-radial flow basket 3-3, through catalyst bed 8-3, and then through the perforations of the central gas collection pipe to become synthesis gas D-3 at about 540° C.

Synthesis gas D-3 is cooled to about 420° C. in feed/effluent exchanger 6-3 to become synthesis gas E-3. Synthesis gas E-3 is further cooled to 400° C. in heat sink exchanger 10-3 to become synthesis gas I-3 and is fed to reactor 2-3. In reactor 2-3, synthesis gas flows axially and radially through the perforations of the outer wall of the axial-radial flow basket 4-3, through catalyst bed 9-3, and then through the perforations of the central gas collection pipe to become synthesis gas F-3 at about 484° C. The ammonia concentration of synthesis gas F-3 is about 20.6 mole percent. Synthesis gas F-3 is cooled to about 325° C. in exchanger 7-3 to generate 105 bar steam and becomes synthesis gas G-3, which is further cooled in exchanger 5-3 while heating synthesis gas A-3 to become synthesis gas B-3 at about 280° C.

Zardi '210 describes a 13 percent reduction in catalyst volume for the first reactor on retrofit to axial-radial flow baskets. There is also a 6 percent reduction in catalyst volume for the second reactor. Those reductions in catalyst volume are the result of placing the axial-radial flow basket inside an existing catalyst containment cartridge and extending the central gas collection pipe to reach far upward into the catalyst bed.

There is no disclosure in Zardi '210 of the effect of catalyst volume reduction on ultimate ammonia concentration.

Conversion of reactors from axial to axial-radial flow is only commercially advantageous with a change in catalyst size, generally from 6–12 mm to 1.5–3 mm. The smaller catalyst, with greater surface diffusivity, results in higher conversion of synthesis gas per amount of catalyst volume. Although the pressure drop per volume of catalyst increases using smaller catalyst if the velocity remains the same, the use of radial or axial-radial flow generally reduces the velocity so that a net reduction in pressure drop is achieved. The present inventor has found that conversion of reactors from axial to axial-radial flow is not necessarily appropriate in all reactors of the Braun synloop.

The effective differences in reactivity of smaller catalyst is not constant through the path travelled by the synthesis gas through a single catalyst bed. Reactivity of smaller catalyst improves as much as 40–50 percent over large grained catalyst in the first half of the first catalyst bed contacted for synthesis gas in the first reactor. The improvement in reactivity of smaller catalyst over large grained catalyst falls steeply after that first half of catalyst contact. The improvement of reactivity of smaller catalyst over large grained catalyst in the second reactor catalyst bed is as small as 15–20 percent at the catalyst bed inlet. At the second reactor catalyst bed outlet, there is very little difference in reactivity between large and smaller catalyst. The overall improvement in reactivity in smaller catalyst over large catalyst in the third reactor catalyst bed is even less than the second.

Since available reactor volume is given up in order to accommodate radial flow, there is far less incentive for providing axial-radial flow in the second or third reactors than in the first. The present inventor has found that a first axial-radial reactor followed by an appropriately designed axial flow reactor can produce the same pressure reduction and ultimate ammonia concentration for the synloop as a two-reactor synloop with only axial-radial reactors. Because the axial reactor has less expense internals than the axial-radial reactor, reduced capital cost can be achieved in some cases through retention of axial flow in the second or subsequent reactors.

FIG. 4 substantially shows the process steps of FIG. 3 with the exception that the reactor 2-3 is changed from axial-radial to axial flow in reactor 2-4. The notations for synthesis gas flows and equipment in FIG. 3 are substantially the same as shown in FIG. 4, except that the suffix number is changed, such as synthesis gas A-3 is changed to synthesis gas A-4. The reaction path for the process steps of FIG. 4 is essentially the same as that shown in FIG. 7 for the process of FIG. 3.

It can be seen that by operating the synthesis converters at lower inlet temperature, the operating pressure of the synthesis process can be reduced from 210 bar to about 150 bar thus saving compressor power. The present invention is most advantageous when the operating pressure of the synthesis process lies within the range of 100 to 250 bars, however the present invention may also be advantageously used outside of that pressure range as well. In addition, although the detailed description of the present invention indicates an inert content of about 3 mole percent, the present invention is most advantageous when the inerts content of the synthesis gas lies within the range 2 to 7 mole percent of the synthesis gas, however the present invention may also be advantageously used outside of that inerts content range as well.

Figure 7:
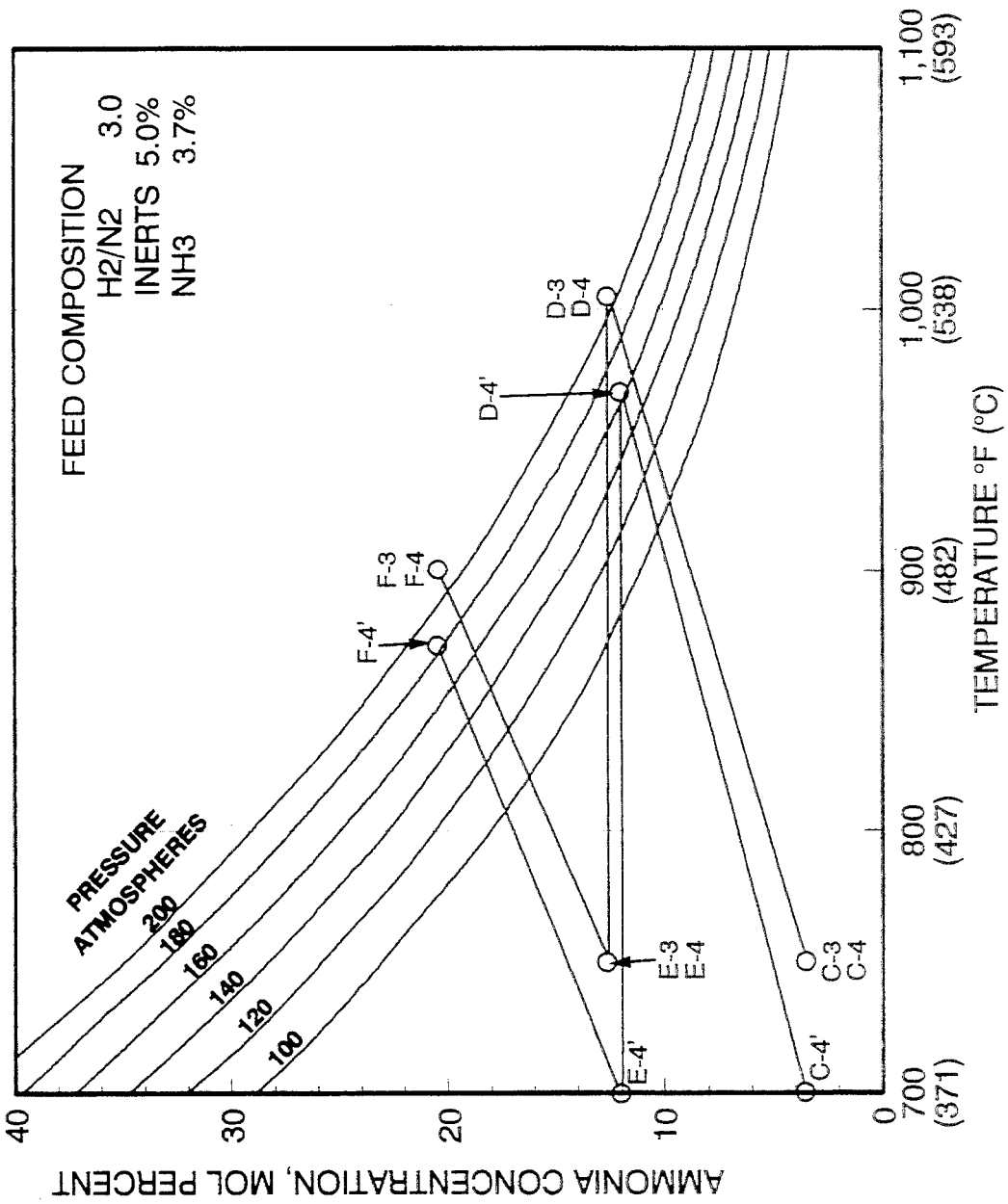
FIG. 7 shows the adiabatic reaction paths for the reactors 1-3 and 2-3 of FIG. 3 and reactors 1-4 and 2-4 of FIG. 4.

It is further an improvement of the present invention to operate the synloop at catalyst bed inlet temperatures in the 350°–380° C. range or lower. FIG. 7 of the present application shows the adiabatic reaction paths for the reactors 1-3 and 2-3 of FIG. 3 and reactors 1-4 and 2-4 of FIG. 4. The adiabatic reaction paths of reactors 1-3 and 1-4 are shown as the line segment C-4' to D-4'. The adiabatic reaction paths of reactors 2-3 and 2-4 are shown as line segment E-4' to F-4'.

It is anticipated that the present invention will be effectively applied in appropriate synloops over a wide range of operating pressures and temperatures, especially taking advantage of the reduction in required inlet temperatures to catalyst beds to improve ultimate ammonia concentration.

In addition, to further reduce pressure drop, the present invention extends to the optimization of pressure drop by lowering catalyst volume in either axial or axial-radial reactors to below levels at which equilibrium can be achieved. Because reducing pressure drop reduces compression utilities, in some cases the higher synthesis gas flow resulting from the reduced ultimate ammonia concentration of lower catalyst volume reactors is justified by the lower pressure drop across such reactors.

I claim:

1. A method of ammonia synthesis using a two- or three-reactor synloop, the improvement comprising:
    a) raising the temperature of (a) an ammonia synthesis gas feed to a first reactor inlet temperature by indirect heat transfer in a feed/effluent exchanger;
    b) removing heat from the synthesis gas effluent from the first reactor first in the feed/effluent exchanger and then in a heat sink exchanger;
    c) feeding the ammonia synthesis gas from the heat sink exchanger to the second reactor; and
    d) providing axial-radial flow means for each reactor in the synloop.

2. The method of claim 1 wherein the synloop operating pressure is within the range 100 to 250 bar.

3. The method of claim 1 wherein the composition of the synthesis gas entering the first reactor contains impurities in the range 2 to 7 mole percent.

4. The method of claim 1 wherein catalyst in the reactors is within the size range 1.5 to 3.0 mm.

5. The method of claim 4 wherein ammonia concentration of synthesis gas effluent from the second reactor is higher than about 19.0 mole percent at a synloop pressure of 210 bar and synthesis gas flow rate through the synloop is thereby significantly reduced.

6. The method of claim 1 wherein the approach to equilibrium temperature in any of the reactors is less than 10° C.

7. The method of claim 1 wherein the synthesis gas feed to the first reactor, prior to heating in the feed/effluent exchanger, is at a temperature of about 280° C.

8. The method of claim 1 wherein the synthesis gas feed to the first reactor is heated to within the range of 350°–380° C. in the feed/effluent exchanger.

9. The method of claim 8 wherein the synthesis gas introduced to each reactor is at a temperature within the range 350°–380° C.

10. A method of ammonia synthesis using a two- or three-reactor synloop, the improvement comprising:
    a) raising the temperature of (a) an ammonia synthesis gas feed to a first reactor inlet temperature by indirect heat transfer in a feed/effluent exchanger;
    b) removing heat from the synthesis gas effluent from the first reactor first in the feed/effluent exchanger and then in a heat sink exchanger;
    c) feeding the ammonia synthesis gas from the heat sink exchanger to the second reactor; and
    d) providing axial-radial flow means for the first reactor and axial flow means for subsequent reactors in the synloop.

11. The method of claim 10 wherein the synloop operating pressure is within the range 100 to 250 bar.

12. The method of claim 10 wherein the composition of the synthesis gas entering the first reactor contains impurities in the range 2 to 7 mole percent.

13. The method of claim 10 wherein catalyst in the reactors is within the size range 1.5 to 3.0 mm.

14. The method of claim 13 wherein ammonia concentration of synthesis gas effluent from the second reactor is higher than about 19.0 mole percent at a synloop pressure of 210 bar and synthesis gas flow rate through the synloop is thereby significantly reduced.

15. The method of claim 10 wherein the approach to equilibrium temperature in the first reactor is less than 10° C.

16. The method of claim 10 wherein the synthesis gas feed to the first reactor, prior to heating in the feed/effluent exchanger, is at a temperature of about 280° C.

17. The method of claim 10 wherein the synthesis gas feed to the first reactor is heated to within the range of 350°–380° C. in the feed/effluent exchanger.

18. The method of claim 17 wherein the synthesis gas introduced to each reactor is at a temperature within the range 350°–380° C.

* * * * *